United States Patent
Yang et al.

(10) Patent No.: US 7,859,988 B2
(45) Date of Patent: Dec. 28, 2010

(54) SYSTEM FOR FLEXIBLE CYCLIC PREFIX LENGTH FOR PREAMBLE SYMBOLS IN AN OFDM BASED COMMUNICATION SYSTEM

(75) Inventors: Yunsong Yang, San Diego, CA (US);
Jianmin Lu, San Diego, CA (US);
Mingyang Sun, Shenzhen (CN)

(73) Assignee: FutureWei Technologies, Inc., Plano, TX (US)

( * ) Notice: Subject to any disclaimer, the term of this patent is extended or adjusted under 35 U.S.C. 154(b) by 646 days.

(21) Appl. No.: 11/754,622

(22) Filed: May 29, 2007

(65) Prior Publication Data

US 2008/0043613 A1    Feb. 21, 2008

Related U.S. Application Data

(60) Provisional application No. 60/815,958, filed on Jun. 22, 2006, provisional application No. 60/820,939, filed on Jul. 31, 2006.

(51) Int. Cl.
*H04J 11/00*    (2006.01)
*H04B 7/208*    (2006.01)

(52) U.S. Cl. .................. 370/208; 370/344; 375/262; 375/341; 455/525

(58) Field of Classification Search ......... 370/203–210, 370/329, 344, 480; 455/63.1, 67.16, 504, 455/525; 375/260–262, 130–132, 219, 295–298, 375/341, 346

See application file for complete search history.

(56) References Cited

U.S. PATENT DOCUMENTS

| | | | |
|---|---|---|---|
| 2004/0218522 A1* | 11/2004 | Sundstrom et al. | 370/208 |
| 2006/0013325 A1* | 1/2006 | Agrawal et al. | 375/260 |
| 2006/0250940 A1* | 11/2006 | Tirkkonen et al. | 370/208 |
| 2007/0093253 A1* | 4/2007 | Lindoff et al. | 455/450 |
| 2007/0211661 A1* | 9/2007 | Tee et al. | 370/329 |

OTHER PUBLICATIONS

"Joint Proposal for 3GPP2 Physical Layer for FDD Spectra," 3rd Generation Partnership Project 2, Jul. 31, 2006, pp. 1-83, China Unicom, et al.

* cited by examiner

*Primary Examiner*—Aung S Moe
*Assistant Examiner*—Habte Mered
(74) *Attorney, Agent, or Firm*—Slater & Matsil, L.L.P.

(57) ABSTRACT

A system providing flexible cyclic prefix length in a preamble (i.e., superframe preamble) is disclosed. The preamble comprises a first section and a second section. The first section contains at least one broadcast channel and occupies the first number of OFDM symbols in the preamble. The second section contains acquisition pilots and occupies the remaining number of OFDM symbols in the preamble. A first cyclic prefix length is used in the first section. It is indicated by the first broadcast channel and is unknown to a mobile station before the mobile station decodes the first broadcast channel. The second cyclic prefix length is used in the second section. It is fixed and known to the mobile stations. The first broadcast channel is located at the last OFDM symbol in the first section and is next to the second section in time.

24 Claims, 2 Drawing Sheets

SYSTEM FOR FLEXIBLE CYCLIC PREFIX LENGTH FOR PREAMBLE SYMBOLS IN AN OFDM BASED COMMUNICATION SYSTEM

PRIORITY CLAIM

This application claims the priority benefits of U.S. Provisional Application No. 60/815,958, filed Jun. 22, 2006, and U.S. Provisional Application No. 60/820,939, filed Jul. 31, 2006.

TECHNICAL FIELD OF THE INVENTION

The present invention relates generally to a wireless communications system and, more particularly, to a system having flexible cyclic prefix lengths for preamble symbols in an OFDM or OFDMA based wireless communications system.

BACKGROUND OF THE INVENTION

In a wideband wireless communications system, a communication signal may be decreased by frequency selective fading due to multi-path transmissions. Conventional OFDM systems have attempted to overcome the problem of frequency selective fading by dividing total signal bandwidth into a plurality of sub-carriers, such that bandwidth on each sub-carrier is sufficiently narrow to provide relatively flat fading for data modulation symbols carried by that sub-carrier. Conventional OFDMA systems have used OFDM modulation techniques to multiplex signal traffic, from a plurality of mobile stations, in both frequency and time domains.

Typically, within a conventional OFDM or OFDMA based wireless communications system, a frame structure may comprise a plurality of "superframes"—wherein each superframe may comprise a superframe preamble frame, and a plurality of traffic frames. Each superframe preamble frame, and each traffic frame, may comprise one or more OFDM symbols.

Each OFDM symbol may comprise an inverse fast Fourier transform (IFFT) symbol, which is the result of an IFFT operation on a modulation data sequence. The OFDM symbol may also comprise a cyclic prefix (CP), which is typically a repetition of the last portion of the associated IFFT symbol, and is typically inserted before the IFFT symbol. The OFDM symbol may also comprise windowing sections, to shape the modulation pulse such that the radio spectrum of the transmitted signal meets emission mask requirement set forth by a radio regulatory body (e.g., the Federal Communication Commission (FCC) in the United States).

A cyclic prefix may be added to each IFFT symbol to address problems of inter-symbol interference (ISI) and inter-carrier interference (ICI). In an OFDM or OFDMA based communication system—assuming maximum delay spread of a channel has a known length L—if cyclic prefix length is chosen to be longer than L, ISI and ICI may be avoided completely, and orthogonality between frequency sub-carriers may be maintained. At a receiver, however, the cyclic prefix goes unused and is simply discarded. As a result, although the cyclic prefix helps eliminate ISI and ICI, it nonetheless adds unutilized overhead and reduces overall system efficiency.

In certain instances, cell size and delay spread of a channel may be different between different operational areas. For example, in urban and rural area systems, different cyclic prefix lengths may be used in each to improve the efficiency for each system. Usually, conventional systems utilize varying cyclic prefix length for traffic frames—while using fixed cyclic prefix length for superframe preamble frames—so that there is no ambiguity at a mobile receiver as to which cyclic prefix length to use when decoding superframe preamble frames. Cyclic prefix length information for traffic frames is indicated by a base station using the superframe preamble.

Although some conventional systems have provided variability of cyclic prefix length for OFDM symbols in a superframe preamble in an attempt to improve system efficiency, increased ambiguity of timing for detecting each OFDM symbol in a superframe preamble has heretofore resulted from extended variability or flexibility of cyclic prefix length in conventional systems. This can potentially degrade performance of a superframe preamble, and reduce coverage of a sector.

These considerations must be balanced against fixed cyclic prefix length approaches—where a cyclic prefix length is one default value for all radio environments—since fixed values tend to be excessive for at least some of the radio environments. Excessive cyclic prefix on OFDM symbols in a superframe preamble tend to reduce overall system efficiency.

As a result, there is a need for methods and/or constructs that provide flexible cyclic prefix length on a superframe preamble while maintaining optimal system performance.

SUMMARY OF THE INVENTION

The present invention provides a system, comprising various methods and apparatus, that provides flexible cyclic prefix lengths for preamble symbols, while optimizing system performance, in an OFDM or OFDMA based wireless communications system.

Various embodiments of the present invention provide flexible cyclic prefix (CP) length on an OFDM symbol in a superframe preamble in an OFDM or OFDMA based communication system. In certain embodiments, CP length on an OFDM symbol in a superframe preamble may be reduced. Other embodiments of the present invention provide a mobile station the capability to decode an OFDM symbol containing cyclic prefix length information without advance notice of that cyclic prefix length. The system of the present invention provides such embodiments without compromising performance of a superframe preamble, or overall system performance.

More specifically, embodiments of the present invention reduce cyclic prefix length for at least one OFDM symbol in a superframe preamble by: sending a first section of the preamble that contains at least a first broadcast channel and occupies a first number of OFDM symbols in the superframe preamble; sending a second section of the preamble that contains acquisition pilots and occupies the remaining number of OFDM symbols in the superframe preamble; applying a first cyclic prefix length on at least the last OFDM symbol in the first section; applying a second cyclic prefix length that is known to a base station and mobile stations on at least the first OFDM symbol in the second section; sending the first broadcast channel on the last OFDM symbol in the first section, followed by the first OFDM symbol in the second section; and indicating the first cyclic prefix length by an indicator in the first broadcast channel.

Other embodiments of the present invention provide for a mobile station locating a received IFFT symbol, of a first broadcast channel, that contains information about a first cyclic prefix length, before the mobile station decodes the first broadcast channel and acquires the information about the first cyclic prefix length.

The following description and drawings set forth in detail a number of illustrative embodiments of the invention. These embodiments are indicative of but a few of the various ways in which the present invention may be utilized.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

The following discussion is presented to enable a person skilled in the art to make and use the invention. The general principles described herein may be applied to embodiments and applications other than those detailed below without departing from the spirit and scope of the present invention as defined herein. The present invention is not intended to be limited to the embodiments shown, but is to be accorded the widest scope consistent with the principles and features disclosed herein.

The present invention provides a system, comprising various methods and apparatus, that provides flexible cyclic prefix lengths for preamble symbols (i.e., superframe preambles), while optimizing system performance, in an OFDM or OFDMA based wireless communications system. Although specific examples of components, signals, messages, protocols, and arrangements are described below to simplify the present disclosure, such are merely examples and are not intended to limit the invention from that described in the claims. Known elements are presented without detailed description in order not to obscure the present invention in unnecessary detail.

According to the present invention, a superframe preamble may comprise a first section and a second section. The first section may contain at least one broadcast channel, and occupy a first number of OFDM symbols in the superframe preamble. The second section may contain acquisition pilots, and occupy the remaining number of OFDM symbols in the superframe preamble. A first cyclic prefix length may be provided in the first section, indicated by the first broadcast channel, and unknown to a mobile station before that mobile station decodes the first broadcast channel. A second cyclic prefix length may be provided in the second section—fixed and known to the mobile stations. This second cyclic prefix length is typically chosen in a more conservative, "one-size-fits-all" manner, in order to accommodate all kinds of radio environment. By the present invention, however, the first cyclic prefix length may be optimized by each system for a specific radio environment. As a result, first cyclic prefix lengths according to the present invention are, generally, likely to be shorter than second cyclic prefix lengths. The first broadcast channel may be located at the last OFDM symbol in the first section, next to the second section in time.

Figure 1:
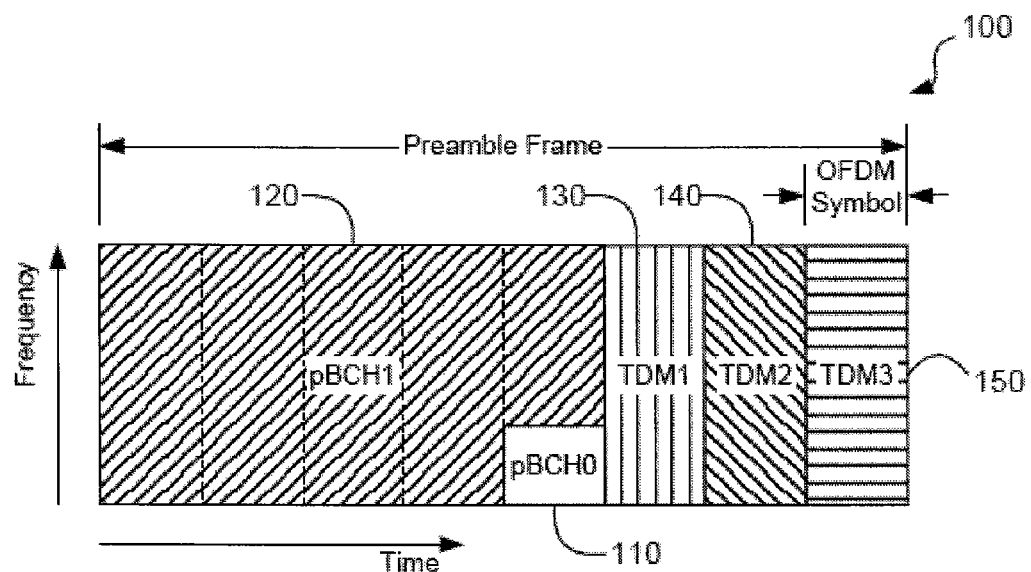
FIG. 1 is a diagram depicting an illustrative structure of a superframe preamble according to certain aspects of the present invention.

Referring now to FIG. 1, an illustrative example of a superframe preamble frame structure, according to the present invention, is depicted. Superframe preamble 100 comprises a first section that comprises broadcast channels pBCH0 110 and pBCH1 120; and occupies a first number of OFDM symbols in preamble 100. Superframe preamble 100 also comprises a second section that comprises acquisition pilots TDM1 130, TDM2 140, and TDM3 150; and occupies the remaining number of OFDM symbols in preamble 100. A first cyclic prefix length, that is used for OFDM symbols in the first section, is provided. An indicator in pBCH0 110 indicates the first cyclic prefix length. A second cyclic prefix length is used for at least the first OFDM symbol in the second section, and is known to the mobile stations. Channel pBCH0 110 is located at the last OFDM symbol of the first section, next to the first OFDM symbol in the second section in time. The location of a received IFFT symbol for pBCH0 110 in time may therefore be determined from a time synchronization operation, without knowing the first cyclic prefix length.

Channel pBCH1 120 is typically used to broadcast sufficient information—such as: information on frequency hopping patterns, pilot structure, and control channel structure, configuration of transmit antennas—and to enable mobile station to demodulate traffic frames that are transmitted by a base station. Channel pBCH1 120 may also broadcast quick paging messages. Some known pilot sequences may be inserted among subcarriers that carry pBCH0 110 and pBCH1 120, to facilitate channel estimation and coherent demodulation of channels by a mobile receiver. According to various embodiments of the present invention, the acquisition pilots TDM1 130, TDM2 140, and TDM3 150 may appear in a different order within the second section, or may be combined into a different number of acquisition pilots, or may occupy a different number of OFDM symbols. The pBCH0 110 may be located anywhere in frequency within the last OFDM symbol in the first section, that boarders with the first OFDM symbol in the second section. The first cyclic prefix length indicated by pBCH0 110 may also be the cyclic prefix length used on OFDM symbols in traffic frames.

In certain embodiments, a third cyclic prefix length may be provided on some OFDM symbols in the first section other than the last OFDM symbol in the first section—where the first cyclic prefix length is used. This third cyclic prefix length may be known to the mobile stations, and may be the same as the second cyclic prefix length. Or, alternatively, the third cyclic prefix length may be indicated by an indicator in pBCH0 110. For example, in order to allow sufficient time for automatic gain control (AGC) circuits at a receiver of a mobile station that is waking up from an idle state to settle to the correct level, it may be desirable to have a longer cyclic prefix length on the first OFDM symbol in the first section—such that the AGC circuits can settle during the cyclic prefix period without distorting the useful signal in the IFFT symbol portion of the first OFDM symbol in the first section. In such a case, a third cyclic prefix length may be used on the first OFDM symbol in the first section, while the first cyclic prefix length is used on the remaining OFDM symbols in the first section, including the last OFDM symbol in the first section where the first broadcast channel is carried on.

In other embodiments, a fourth cyclic prefix length may be provided on some OFDM symbols in the second section, other than the first OFDM symbol in the second section, where the second cyclic prefix length is used. This fourth cyclic prefix length may be indicated by an indicator in pBCH0 110 and may be the same as the first cyclic prefix length. For example, if the second section of preamble 100 includes additional OFDM symbols that do not contain any information used to generate the waveform of the last OFDM symbol in the first section, then cyclic prefix length on these additional OFDM symbols may be reduced using a fourth cyclic prefix length that is shorter than the second cyclic prefix length.

According to the present invention, the cyclic prefix length for at least one OFDM symbol in a superframe preamble is reduced. A first section of the preamble is sent, comprising at least a first broadcast channel and occupying a first number of OFDM symbols in the superframe preamble. A second section of the preamble is sent, comprising acquisition pilots and occupying the remaining number of OFDM symbols in the superframe preamble. A first cyclic prefix length is applied on at least the last OFDM symbol in the first section; and a second cyclic prefix length that is known to the base station and mobile stations is applied on at least the first OFDM symbol in the second section. The first broadcast channel on the last OFDM symbol in the first section is sent, followed by the first OFDM symbol in the second section. The first cyclic prefix length is indicated by an indicator in the first broadcast channel.

Figure 2:
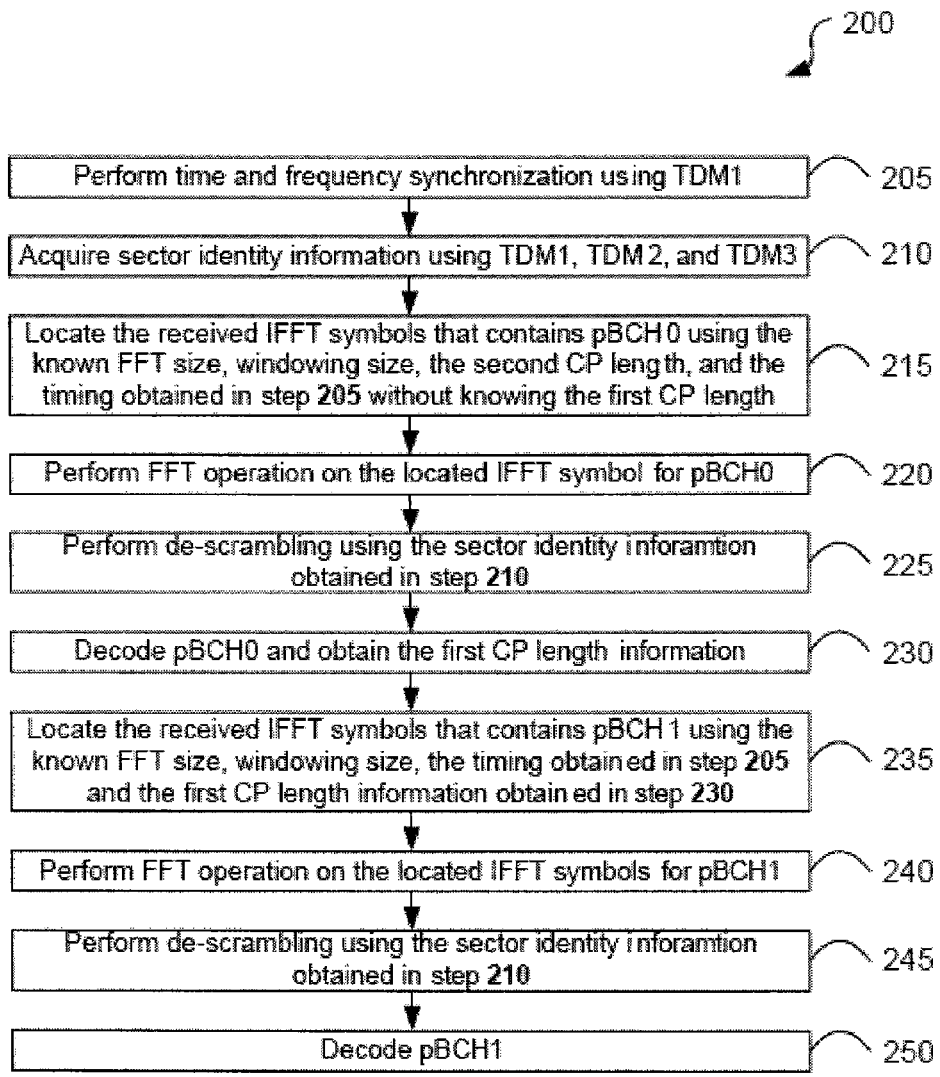
FIG. 2 depicts an illustrative example of a mobile station procedure for decoding a superframe preamble, of the type illustrated in FIG. 1, according to other aspects of the present invention

FIG. 2 provides an illustrative example of a mobile station procedure 200 for decoding a superframe preamble 100. Referring to FIGS. 1 and 2, a mobile station receiver initially uses autocorrelation of acquisition pilot TDM1 130 with a fixed and known FFT size, windowing size, and a second cyclic prefix length, to synchronize in both time and frequency with a received signal in step 205. In step 210, the mobile station further uses acquisition pilots TDM1 130, TDM2 140, and TDM3 150 to acquire sector identity information. In step 215, the mobile station locates a received IFFT symbol that contains pBCH0 110, using the fixed and known FFT size and windowing size, the timing obtained in step 205, and the second cyclic prefix length; without having the first cyclic prefix length. In step 220, the mobile station performs an FFT operation on the located IFFT symbol that contains pBCH0 110. In step 225, the mobile station further de-scrambles the FFT-transformed pBCH0 110 sequence in the frequency domain using a de-scrambling sequence generated with the sector identity information obtained in step 210.

In step 230, the mobile station decodes pBCH0 110 and obtains information about a first cyclic prefix length for the OFDM symbols in the first section. In step 235, the mobile station locates received IFFT symbols that contain pBCH1 120 using the fixed and known FFT size and windowing size, the timing obtained in step 205, the first cyclic prefix length information obtained in step 230, and—if it is utilized in the first section—information about a third cyclic prefix length. In step 240, the mobile station performs the FFT operation on located IFFT symbols that contain pBCH1 120. In step 245, the mobile station further de-scrambles the FFT-transformed pBCH1 120 sequence in the frequency domain, using the de-scrambling sequence that is generated with the sector identity information obtained in step 210. In step 250, the mobile station decodes pBCH1 120.

In certain embodiments, a complete pBCH0 110 message may be encoded and transmitted over multiple superframe preamble frames 100. In such instances, a mobile receiver may repeat steps 205 to 225, until all modulation symbols for the encoded pBCH0 110 message are received, before proceeding to step 230.

Figure 3:
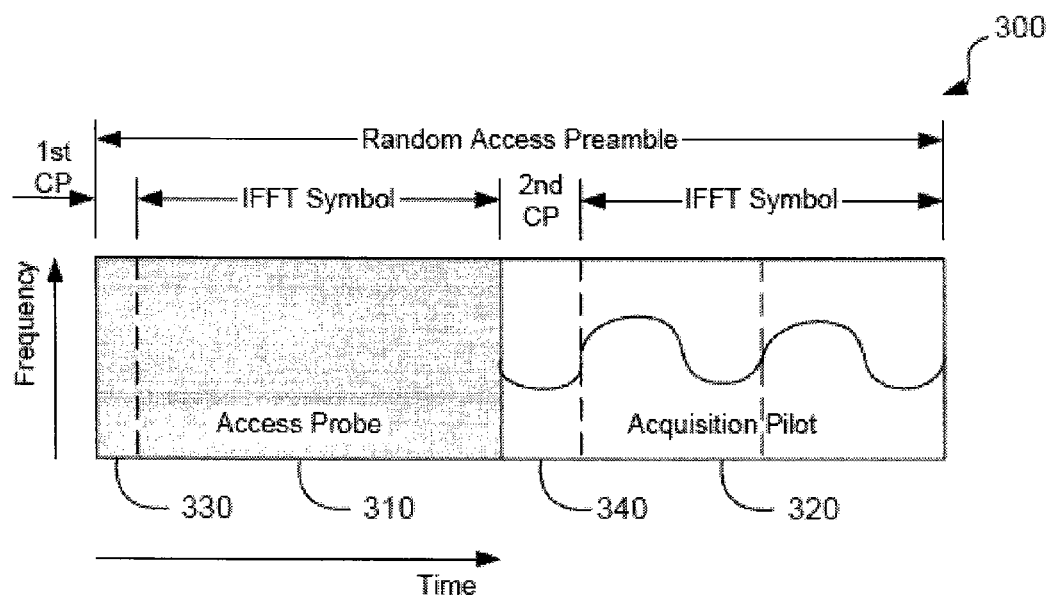
FIG. 3 depicts an illustrative example of a random access preamble structure, in a contention-based system such as WLAN, according to the present invention.

The system of the present invention may be employed to provide flexible cyclic prefix length on other types of preambles in, for example, contention-based or non-contention-based, synchronous or asynchronous communication systems. FIG. 3 provides an illustrative example of a random access preamble structure, in a contention-based system such as WLAN, according to the present invention. Referring to FIG. 3, a random access preamble 300 comprises an access probe 310 in a first section, and an acquisition pilot 320 in a second section. Length of a first cyclic prefix 330 for the first section may be selected or determined by the access terminal, and unknown to a receiver at an access point, while length for a second cyclic prefix 340 for the second section is fixed and known to the receiver at the access point. Since the signal of acquisition pilot 220 is repetitive by nulling out every other frequency subcarriers, as illustrated in FIG. 3, the receiver at the access point may utilize autocorrelation of acquisition pilot 320 to determine timing of a received signal. The access point may use this timing, FFT size, windowing size, and length of second cyclic prefix 340 to locate a received IFFT symbol that contains access probe 310. The access point then decodes the information, which may include the length of the first cyclic prefix 330 or the length of the cyclic prefix that shall be used for the rest of the communications between the access terminal and the access point, in access probe 310.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. For example, the system of the present invention may be employed in a frequency division duplex (FDD) system, as well as in a time division duplex (TDD) system. These and other such variations are hereby comprehended by the present invention. Thus, the present invention is not intended to be limited to the embodiments shown herein but is to be accorded the widest scope consistent with the principles and novel features disclosed herein.

What is claimed is:

1. A method of reducing cyclic prefix length for an OFDM symbol in a preamble, the method comprising the steps of:
   sending a first section of the preamble from a base station, the first section comprising a first broadcast channel and occupying a first number of OFDM symbols in the preamble;
   sending a second section of the preamble from the base station, the second section comprising acquisition pilots and occupying a remaining number of OFDM symbols in the preamble;
   at the base station, applying a first cyclic prefix length on a last OFDM symbol in the first section;
   at the base station, applying a known second cyclic prefix length on a first OFDM symbol in the second section;
   sending the first broadcast channel on the last OFDM symbol in the first section, the first broadcast channel being followed by the first OFDM symbol in the second section;
   indicating the first cyclic prefix length by a first indicator in the first broadcast channel; and determining at a receiver a location of the first broadcast channel by first performing time synchronization operation using a known FFT (Fast Fourier Transform) size and the known second cyclic prefix length.

2. The method of claim 1, wherein the first cyclic prefix length is unknown to a receiver prior to the receiver decoding the first broadcast channel.

3. The method of claim 1, wherein the second cyclic prefix length is fixed and known to a mobile station receiving the second cyclic prefix.

4. The method of claim 1, further comprising the step of applying the first cyclic prefix length on the remaining OFDM symbols in the first section, other than the last OFDM symbol in the first section.

5. The method of claim 1, further comprising the step of applying a third cyclic prefix length on the first OFDM symbol in the first section.

6. The method of claim 5, wherein the third cyclic prefix length is known to a mobile station receiving the third cyclic prefix.

7. The method of claim 6, wherein the third cyclic prefix length is identical to the second cyclic prefix length.

8. The method of claim 1, further comprising the step of applying the second cyclic prefix length on the remaining OFDM symbols in the second section other than the first OFDM symbol in the second section.

9. The method of claim 1, further comprising the step of providing a fourth cyclic prefix length on at least one OFDM symbol in the second section other than the first OFDM symbol in the second section.

10. The method of claim 1, further comprising a second broadcast channel in the first section, wherein the second broadcast channel comprises system information.

11. The method of claim 1, wherein the first cyclic prefix length applied to the first section of the preamble is the same as a cyclic prefix length for traffic frames.

12. A wireless communications system having a transmitter using a flexible cyclic prefix length for an OFDM symbol in a preamble, the system comprising:
a first section of the preamble that comprises a first broadcast channel and occupies a first number of OFDM symbols in the preamble;
a second section of the preamble that comprises acquisition pilots and occupies a remaining number of OFDM symbols in the preamble;
a first cyclic prefix length applied by the transmitter on a last OFDM symbol in the first section;
a known second cyclic prefix length applied on a first OFDM symbol in the second section;
wherein the first broadcast channel is sent on the last OFDM symbol in the first section, and followed by the first OFDM symbol in the second section;
wherein the first cyclic prefix length is indicated by a first indicator in the first broadcast and a receiver determines a location of the first broadcast channel by first performing time synchronization operation using a known FFT (Fast Fourier Transform) size and the known second cyclic prefix length.

13. The system of claim 12, wherein the first cyclic prefix length is unknown to a receiver prior to the receiver decoding the first broadcast channel.

14. The system of claim 12, wherein the second cyclic prefix length is fixed and known to a mobile station receiving the second cyclic prefix.

15. The system of claim 12, wherein the first cyclic prefix length is further applied on the remaining OFDM symbols in the first section other than the last OFDM symbol in the first section.

16. The system of claim 12, further comprising a third cyclic prefix length applied on the first OFDM symbol in the first section.

17. The system of claim 16, wherein the third cyclic prefix length is known to a mobile station receiving the third cyclic prefix.

18. The system of claim 17, wherein the third cyclic prefix length is identical to the second cyclic prefix length.

19. The system of claim 12, wherein the second cyclic prefix length is applied on the remaining OFDM symbols in the second section other than the first OFDM symbol in the second section.

20. The system of claim 12, further comprising a fourth cyclic prefix length applied on at least one OFDM symbol in the second section other than the first OFDM symbol in the second section.

21. A method of acquiring a first cyclic prefix length used on an OFDM symbol in a preamble in an OFDM or OFDMA based communications system, the method comprising the steps of:
providing an access probe in a first section of the preamble;
providing acquisition pilots in a second section immediately of the preamble, the second section following the first section;
receiving the preamble at a receiver, the receiver being operable to:
perform time and frequency synchronization using the acquisition pilots;
acquire sector identity information using the acquisition pilots;
locate a received IFFT symbol in the first section using the second cyclic prefix length and FFT size known to the receiver, the IFFT symbol comprising a first cyclic prefix length information;
transform the received IFFT symbol to yield the access probe; and
decode the access probe to yield the first cyclic prefix length information, wherein the first cyclic prefix length is the same as a cyclic prefix length applied on OFDM symbols in the first section of the preamble.

22. A method of providing flexible cyclic prefix length on OFDM symbols in a preamble in an OFDM or OFDMA based communication system, the method comprising the steps of:
transmitting from a base station a first section of the preamble having at least one broadcast channel and occupying a first number of OFDM symbols in the preamble; and
transmitting from the base station a second section of the preamble having acquisition pilots and occupying a remaining number of OFDM symbols in the preamble, the second section following the first section, wherein the first section comprises a first cyclic prefix length applied on OFDM symbols in the first section, wherein the second section comprises a second cyclic prefix length applied on OFDM symbols in the second section, the second cyclic prefix length being different from the first cyclic prefix length; wherein the first cyclic prefix length is indicated by a first broadcast channel, wherein the first broadcast channel is located at the last OFDM symbol in the first section and is next to the second section in time; and a receiver determines a location of the first broadcast channel by first performing time synchronization operation using FFT (Fast Fourier Transform) size and the second cyclic prefix length.

23. The method of claim 22, wherein the first cyclic prefix length is indicated by the first broadcast channel in the first section and is unknown to a mobile station receiving the first broadcast channel prior to mobile station decoding of the first broadcast channel.

24. The method of claim 22, wherein the second cyclic prefix length is fixed and is known to mobile stations in the communications system.

* * * * *